UNITED STATES PATENT OFFICE.

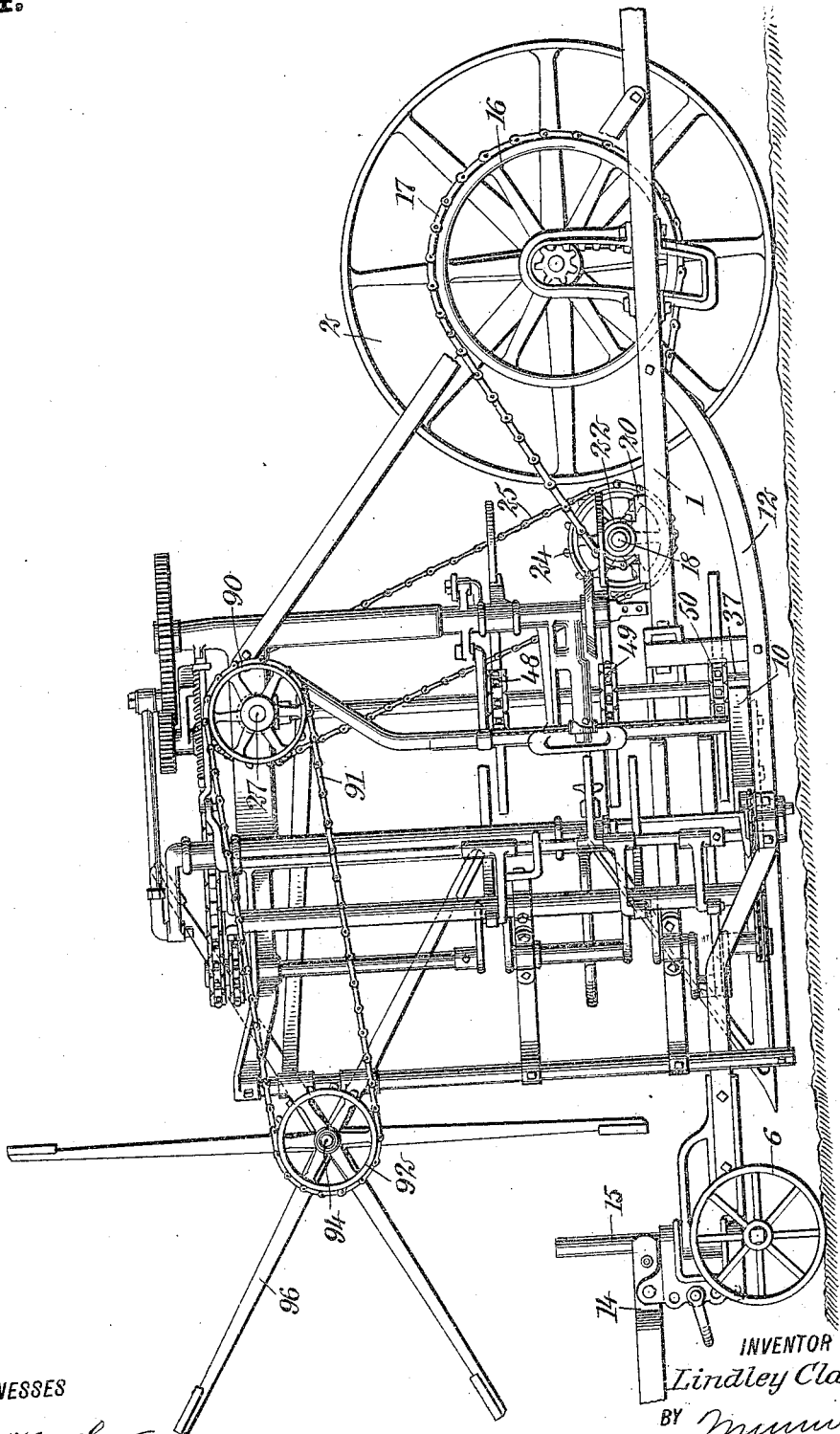

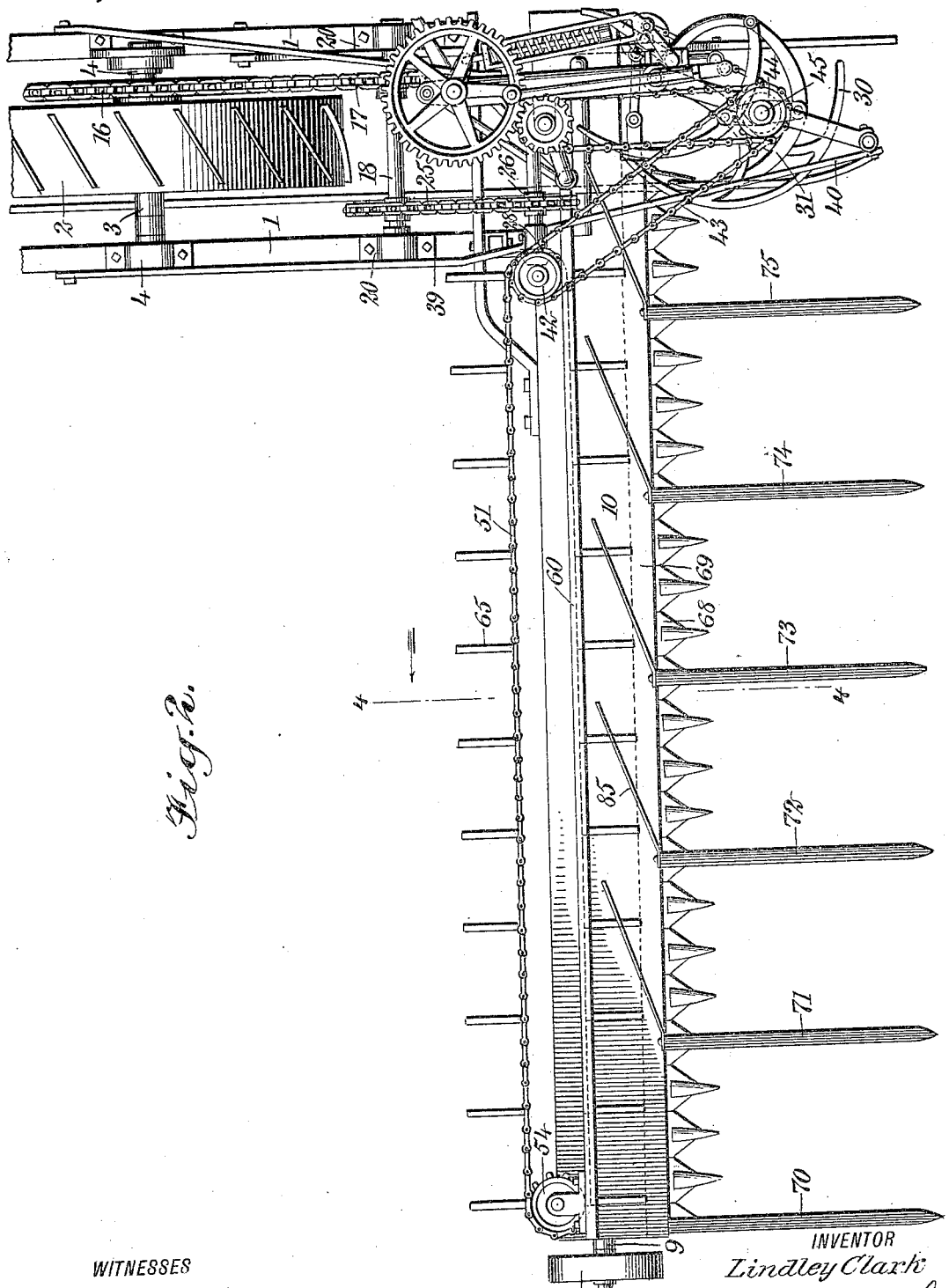

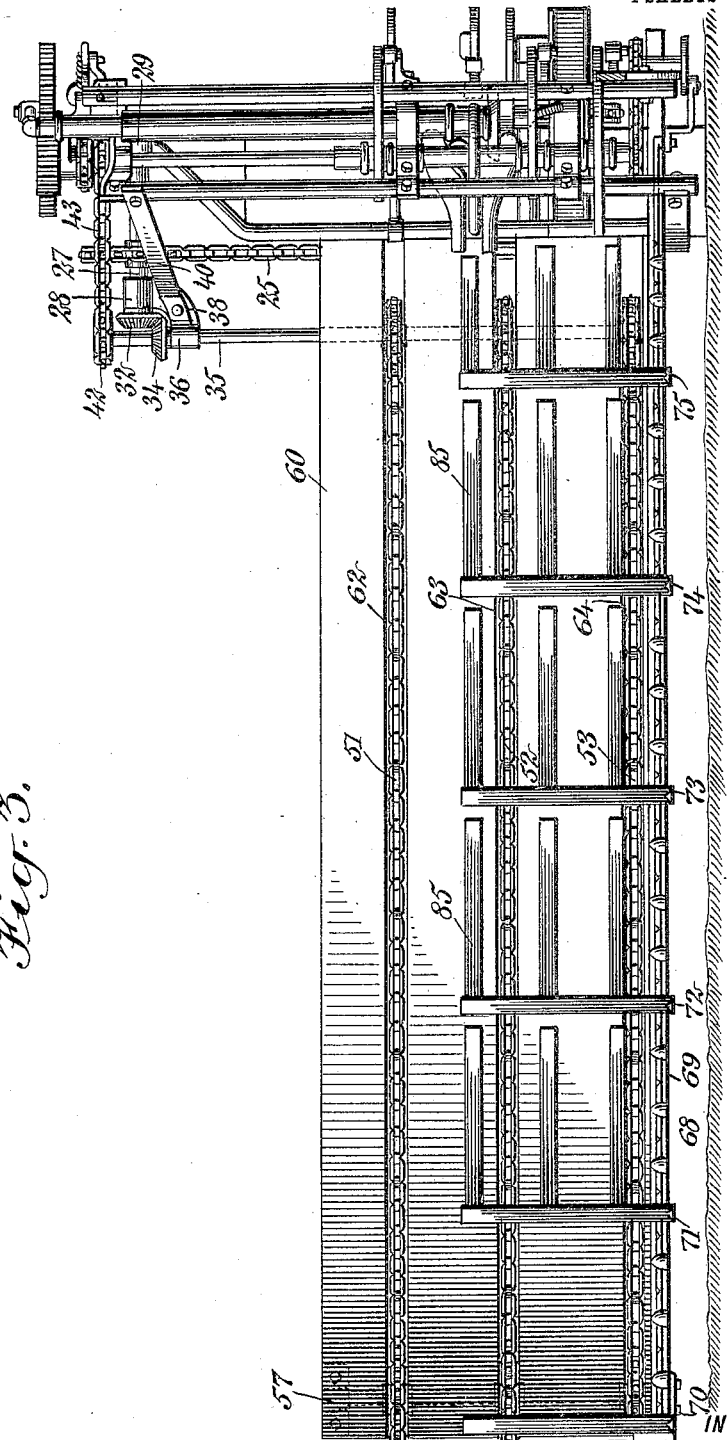

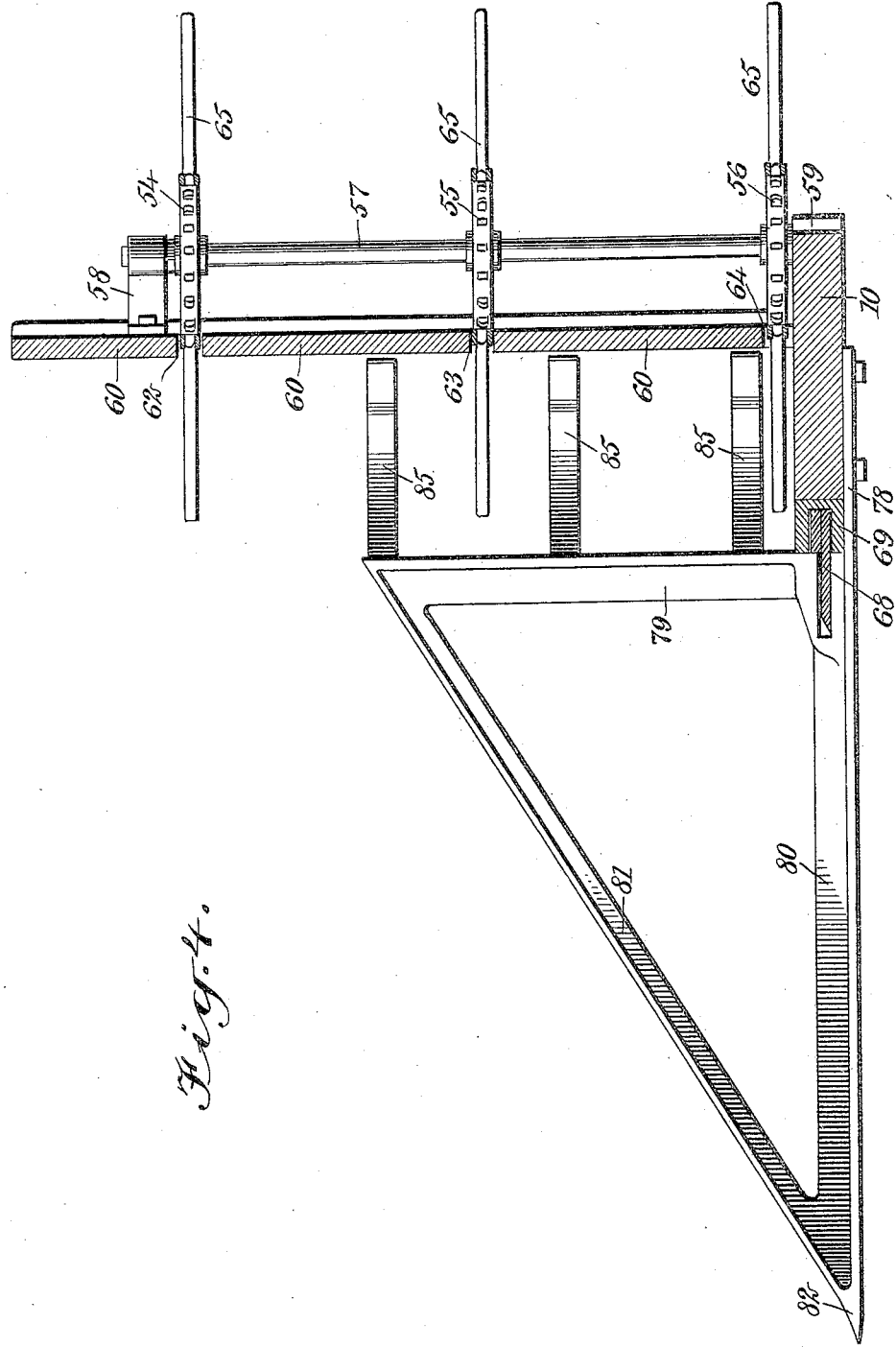

LINDLEY CLARK, OF GREENFIELD, INDIANA.

GRAIN-CUTTER.

942,614. Specification of Letters Patent. Patented Dec. 7, 1909.

Application filed March 25, 1909. Serial No. 485,698.

*To all whom it may concern:*

Be it known that I, LINDLEY CLARK, a citizen of the United States, and a resident of Greenfield, in the county of Hancock and State of Indiana, have invented a new and Improved Grain-Cutter, of which the following is a full, clear, and exact description.

This invention relates to grain cutters for use in connection with binders.

The object of the invention is to provide a combined cutter and binder, whereby the grain may be bound into bundles while in upright position, as it is cut from the ground.

A further object is to provide improved means for dividing the grain as it is about to be cut and supporting said grain after it is cut, in upright position, and transporting it to a binder mechanism while still in the upright position.

The invention consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is an end elevation as viewed from the right-hand side of the machine; Fig. 2 is a plan view with the reel and front of the machine omitted; Fig. 3 is a front elevation with the reel omitted; and Fig. 4 is a section taken on the line 4—4 in Fig. 2, looking in the direction of the arrow.

In its present embodiment, I have shown my grain cutter as connected with a so-called McCormick binder sustained in vertical position. It is to be understood that my invention is clearly applicable to other forms of binder, and the present form is merely chosen as an illustration. As thus combined, the machine comprises a frame 1 supported at one end by a main or driving wheel 2 mounted upon an axle 3 journaled in suitable bearings 4 secured to said frame. Two wheels 6 are mounted to support the front end of the frame 1, one of said wheels appearing in Fig. 1.

A wheel 8 is mounted upon a shaft journaled in a bearing 9 supported upon the under side of a board or other suitable supporting member 10 extending longitudinally of the grain cutter and acting as a support for the butts of the grain stalks when they have been cut by the cutter bar, as will be hereinafter explained. The right-hand end of the supporting member 10, as viewed in Figs. 1 and 2, is secured to a depending frame 12 which is attached to the frame 1. A draw-bar 14 is mounted about a post 15 secured at the front end of the frame 1, as shown in Fig. 1.

A sprocket wheel 16 is mounted to rotate with the driving wheel 2 and operates by means of a chain 17 to drive a jack-shaft 18 journaled in bearings 20 mounted upon the frame 1, and having a sprocket-pinion 22 secured thereon. Mounted upon the jack-shaft 18 to rotate therewith is a sprocket wheel 24 coöperating with a chain 25 which passes around a sprocket wheel 26 secured to a shaft 27 journaled in bearings 28 and 29 which are suitably supported upon the framework of the binder. Said binder is of the usual construction and provided with means for operating needles 30 and packers 31.

The binder mechanism forms no part of my invention, and need not, therefore, be specifically described.

A bevel-gear 32 is mounted upon the shaft 27 to rotate therewith, and meshes with a bevel-gear 34 which is secured to a vertical shaft 35 journaled in bearings 36 and 37. The bearing 36 is united with the bearing 28 by means of a web 38. Said web is fastened to straps 39 and 40, which are suitably attached to the framework of the machine. Mounted upon the upper end of the shaft 35 is a sprocket wheel 42 coöperating with a chain 43 passing around a sprocket wheel 44 secured to the upper end of a crank-shaft 45 which operates the needles and packers.

Secured to the shaft 35 are sprocket-wheels 48, 49 and 50, which coöperate with chains 51, 52 and 53 respectively, passing over sprocket-wheels 54, 55 and 56, which are secured to a vertical shaft 57 journaled in bearings 58 and 59. The bearing 58 is mounted upon a vertical wall or support 60 extending upwardly from the horizontal support 10. Said vertical support 60 is formed with longitudinal slots 62, 63 and 64 within which the chains 51, 52 and 53 respectively travel. Each of the chains 51, 52 and 53 is fitted with a series of arms 65 which project from said chain, and are adapted to engage the grain after it is cut, to feed the same toward the binding mechanism; the wall 60 aiding to retain the grain in upright position while it is being transported over the support 10 to said binding mechanism.

A cutter-bar 68 is mounted to reciprocate in a guide 69 secured to the front face of the support 10.

A plurality of dividing members, numbered 70 to 75 inclusive, are fastened to the support 10 by means of bars 78 bolted to the under side of said support. Said dividing members are formed of a triangular frame having a rear upright member 79, a horizontal member 80 and an inclined member 81. Each dividing member may be provided with a point 82 which readily enters between the grain stalks as they stand upon the ground, in order to divide the grain into sections which are to be cut by the cutter-bar 68. Attached to the upright member 79 of each of the dividing members 71 to 75 inclusive, are a plurality of spring fingers 85 which extend diagonally from said upright member and aid in retaining the grain sections in their upright position as they are being transported over the supporting member 10 by the arms 65.

A sprocket wheel 90 is secured to the shaft 27 and coöperates with a chain 91 passing over a sprocket wheel 92 mounted upon a horizontal shaft 94 journaled in suitable bearings secured to the framework of the machine. Mounted to rotate with the shaft 94 is a reel 96. This reel is shown only in end elevation in Fig. 1, but it is to be understood that it is to be mounted in suitable bearings supported from the framework.

The operation of the machine is as follows:—When the wheel 2 travels over the ground, the sprocket wheel 16 is rotated, and by means of the intervening mechanism, comprising the sprocket wheels and chains, the shaft 27 is rotated, which in turn rotates the vertical shaft 35 upon which the feeding chains 51, 52 and 53 are mounted. The cutter-bar 68 is reciprocated by connections with the driving mechanism, and, as the grain is divided by the dividing members 70 to 75, it is cut by the cutter-bar and transported along the support 10 by means of the arms 65 on the chains 51, 52 and 53. The grain sections then enter the binder and are bound together in the well-known manner.

Having thus described my invention, I claim as new and desire to secure by Letters Patent:—

1. The combination with a binder, of means for dividing the grain to be cut into sections, means for cutting the grain sections, and means for conveying the cut grain in upright position to said binder, comprising a support for the butts of the grain stalks, and a plurality of chains arranged one above the other and each provided with arms engaging the grain to move it over said support.

2. The combination with a binder, of means for dividing the grain to be cut, means for cutting the grain, means for retaining the cut grain in upright position, comprising a plurality of spring fingers associated with each dividing means, means for supporting the butts of the grain stalks, a plurality of chains moving over said support, and a plurality of arms on each chain arranged to move the grain in upright position to the binder.

3. The combination with a binder, of means for dividing the grain to be cut, comprising a plurality of triangular frames, a support, a cutter mounted on said support, a guide extending along said support for retaining the cut grain in upright position, a plurality of inclined spring fingers mounted on said triangular frames, a plurality of chains mounted to travel longitudinally along said guide, and a plurality of arms mounted on each of said chains.

4. The combination with a binder, of a support, a cutter-bar mounted on said support, a plurality of triangular guides secured to said support, a plurality of fingers secured to said guides, an upright wall mounted to extend along said support and having longitudinal slots therein, a shaft rotatably mounted at each end of said slots, a plurality of sprocket-wheels mounted on each shaft, a plurality of chains having arms and passing over said wheels, and means for rotating said shafts.

5. The combination with a binder, of a plurality of triangular members for dividing the grain, a reel rotatably mounted, means for cutting the grain, a support for the butts of the grain stalks, a plurality of inclined spring fingers mounted on said triangular members, an upright guide extending along said support, and a plurality of feed chains passing along said upright guide, each having a plurality of arms secured thereto.

6. The combination with a binder, of a cutting mechanism, a support at the rear of the cutting mechanism, triangular members projecting forwardly from the cutting mechanism, and dividing the grain to be cut into sections, a plurality of inclined guides for each of the projecting members for guiding the cut sections of grain onto the support, and means for conveying the said sections of grain to the binder.

In testimony whereof I have signed my name to this specification in the presence of two subscribing witnesses.

LINDLEY CLARK.

Witnesses:
W. C. CHOATE,
ARTHUR C. VAN DUYN.